(12) United States Patent
Bi et al.

(10) Patent No.: US 11,698,964 B2
(45) Date of Patent: Jul. 11, 2023

(54) MALWARE DETECTION IN MEMORY

(71) Applicant: INTEL CORPORATION, Santa Clara, CA (US)

(72) Inventors: Danyu Bi, Shanghai (CN); Salmin Sultana, Hillsboro, OR (US); Yuanyuan Li, Shanghai (CN); Yong Jiang, Shanghai (CN); Pramod Pesara, Portland, OR (US); Selvakumar Panneer, Portland, OR (US); Ravi Sahita, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 458 days.

(21) Appl. No.: 16/650,643

(22) PCT Filed: Dec. 13, 2017

(86) PCT No.: PCT/CN2017/115955
§ 371 (c)(1),
(2) Date: Mar. 25, 2020

(87) PCT Pub. No.: WO2019/113843
PCT Pub. Date: Jun. 20, 2019

(65) Prior Publication Data
US 2020/0320196 A1    Oct. 8, 2020

(51) Int. Cl.
*G06F 21/56* (2013.01)
*G06F 9/448* (2018.01)
(Continued)

(52) U.S. Cl.
CPC .......... *G06F 21/56* (2013.01); *G06F 9/30061* (2013.01); *G06F 9/448* (2018.02);
(Continued)

(58) Field of Classification Search
CPC ............. G06F 11/3636; G06F 12/1009; G06F 9/30149; G06F 9/448; G06F 9/30061;
(Continued)

(56) References Cited

U.S. PATENT DOCUMENTS 8,881,282 B1 *  11/2014  Aziz ..................... G06F 21/561
                                                        726/23
9,135,414 B1 *   9/2015  Biffle ...................... G06F 21/52
(Continued)

OTHER PUBLICATIONS

International Search Report for Related PCT Application No. PCT/CN2017/115955 with a completion date of Sep. 20, 2018, 5 pages.

*Primary Examiner* — Tuan A Vu
(74) *Attorney, Agent, or Firm* — KDW Firm PLLC (57) ABSTRACT

A system for detecting malware includes a processor to collect processor trace information corresponding to an application being executed by the processor (202). The processor can also detect an invalid indirect branch instruction from the processor trace information (204) and detect at least one malware instruction being executed by the application in response to analyzing modified memory values corresponding to the invalid indirect branch (206). Additionally, the processor can block the application from accessing or modifying memory (208).

21 Claims, 7 Drawing Sheets

(51) Int. Cl.
  *G06F 9/30*    (2018.01)
  *G06F 11/36*   (2006.01)
  *G06F 12/1009* (2016.01)
  *H04L 9/40*    (2022.01)

(52) U.S. Cl.
  CPC ...... *G06F 11/3636* (2013.01); *G06F 12/1009* (2013.01); *G06F 21/566* (2013.01); *H04L 63/145* (2013.01); *H04L 63/1441* (2013.01)

(58) Field of Classification Search
  CPC .. G06F 12/1458; G06F 12/121; G06F 21/561; G06F 21/53; G06F 21/566; G06F 21/52; G06F 21/5466; G06F 21/56; H04L 45/30; H04L 63/20; H04L 63/1441; H04L 63/145
  See application file for complete search history.

(56) References Cited

U.S. PATENT DOCUMENTS

| | | |
|---|---|---|
| 9,756,069 B1 | 9/2017 | Li et al. |
| 2006/0200863 A1 | 9/2006 | Ray et al. |
| 2010/0199063 A1* | 8/2010 | Sechrest ............... G06F 12/121 711/204 |
| 2013/0036464 A1* | 2/2013 | Glew .................. G06F 9/30149 726/22 |
| 2013/0117849 A1* | 5/2013 | Golshan .................. G06F 21/53 726/23 |
| 2016/0283714 A1 | 9/2016 | Lemay et al. |
| 2016/0283717 A1 | 9/2016 | Lemay et al. |
| 2016/0328742 A1* | 11/2016 | Shiravi Khozani ..... G06F 21/53 |
| 2017/0177368 A1* | 6/2017 | DeHon ............... G06F 12/1458 |
| 2018/0077228 A1* | 3/2018 | Blagodurov ............ H04L 45/30 |
| 2018/0219834 A1* | 8/2018 | Ben-Benjamin ........ H04L 63/20 |

\* cited by examiner

MALWARE DETECTION IN MEMORY

CROSS REFERENCE TO RELATED APPLICATIONS

Pursuant to 35 U.S.C. § 371, this application is the United States National Stage Application of International Patent Application No. PCT/CN2017/115955, filed on Dec. 13, 2017, the contents of which are incorporated by reference as if set forth in their entirety herein.

TECHNICAL FIELD

This disclosure relates generally to detecting malware and specifically, but not exclusively, to detecting malware in memory based in part on processor trace information.

BACKGROUND

Computing devices can execute applications retrieved from various locations such as remote storage devices, remote databases, and remote servers, among others. In some examples, applications stored in a computing device can also be modified based on instructions received from external sources. In some examples, the retrieved applications or modified applications can include malware that enables unauthorized users to access data on a local device.

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Malware applications have widely used packing to obscure malicious code and evade detection by security tools. Packers keep the malware code obfuscated via compression and encryption until the code is unpacked in memory and executed. To defend against packed malware applications, some techniques can scan processor memory to find malware-indicative patterns or signatures when the malicious code is unpacked or about to execute. However, some techniques incur high performance and resource overhead and long scan intervals due to, for example, the large amount of memory that needs to be scanned. Rather than indiscriminately scanning memory, limiting memory inspection to recently accessed pages can reduce overhead and enable faster memory scans. To identify recently accessed memory, techniques can interact with the address translation system or utilize page modification logs (PML) in a virtualized environment. However, these techniques may be evaded as the techniques fail to prioritize the memory pages to be scanned due to the page modification threshold based triggers of memory scanning. The techniques also depend on hardware changes or a virtualized environment.

The techniques described herein include an execution trace based approach to effectively prioritize the memory pages to scan and initiate memory scanning as soon as an application exhibits suspicious behavior. The techniques herein can utilize any suitable processor Trace (PT) to find the recently executed memory pages, a control flow integrity (CFI) violation of an executed application to trigger memory scanning, and graphics processing unit (GPU) acceleration to further reduce performance overhead.

The techniques described herein include collecting processor trace information corresponding to an application being executed by the processor. Additionally, the techniques herein can include detecting an invalid indirect branch instruction from the processor trace information. Furthermore, the techniques herein can include detecting at least one malware instruction being executed by the application in response to analyzing modified memory values corresponding to the invalid indirect branch. Moreover, the techniques herein can include blocking the application from accessing or modifying memory.

In some embodiments, the techniques for detecting the at least one malware instruction can rely upon any number of queues, tables, and the like. In some examples, the techniques can include utilizing anti-virus software pattern matching to detect a signature or pattern of malware. In some embodiments, GPUs can be used to accelerate pattern matching techniques due to the GPUs cost-effectiveness and massive data parallel computing capability.

In some embodiments, the techniques include applying a double-array trie to create a transition table for pattern matching. In the double-array structure, a "base" array and a "check" array are two parallel arrays, which can be combined into one single table. The decrease of Look-up-Tables (LUTs) in GPUs can result in faster pattern matching performance. In some embodiments, a maximum number of read operations from a single transition table can be the same as the length of a pattern of malware, which can improve throughput performance. In some embodiments, a compressed state transition table can be created to reduce memory consumption and increase utilization of execution units in GPUs while analyzing sparse patterns. Accordingly, some embodiments utilize a new single table data structure for pattern matching techniques that detect malware instructions.

Therefore, the techniques described herein can detect malware instructions being executed by a processor based on processor trace information and single table data structures, among other data structures. In some examples, the techniques can include prioritizing processor trace information to be analyzed for malware instructions.

Reference in the specification to "one embodiment" or "an embodiment" of the disclosed subject matter means that a particular feature, structure, or characteristic described in connection with the embodiment is included in at least one embodiment of the disclosed subject matter. Thus, the phrase "in one embodiment" may appear in various places throughout the specification, but the phrase may not necessarily refer to the same embodiment.

Figure 1:
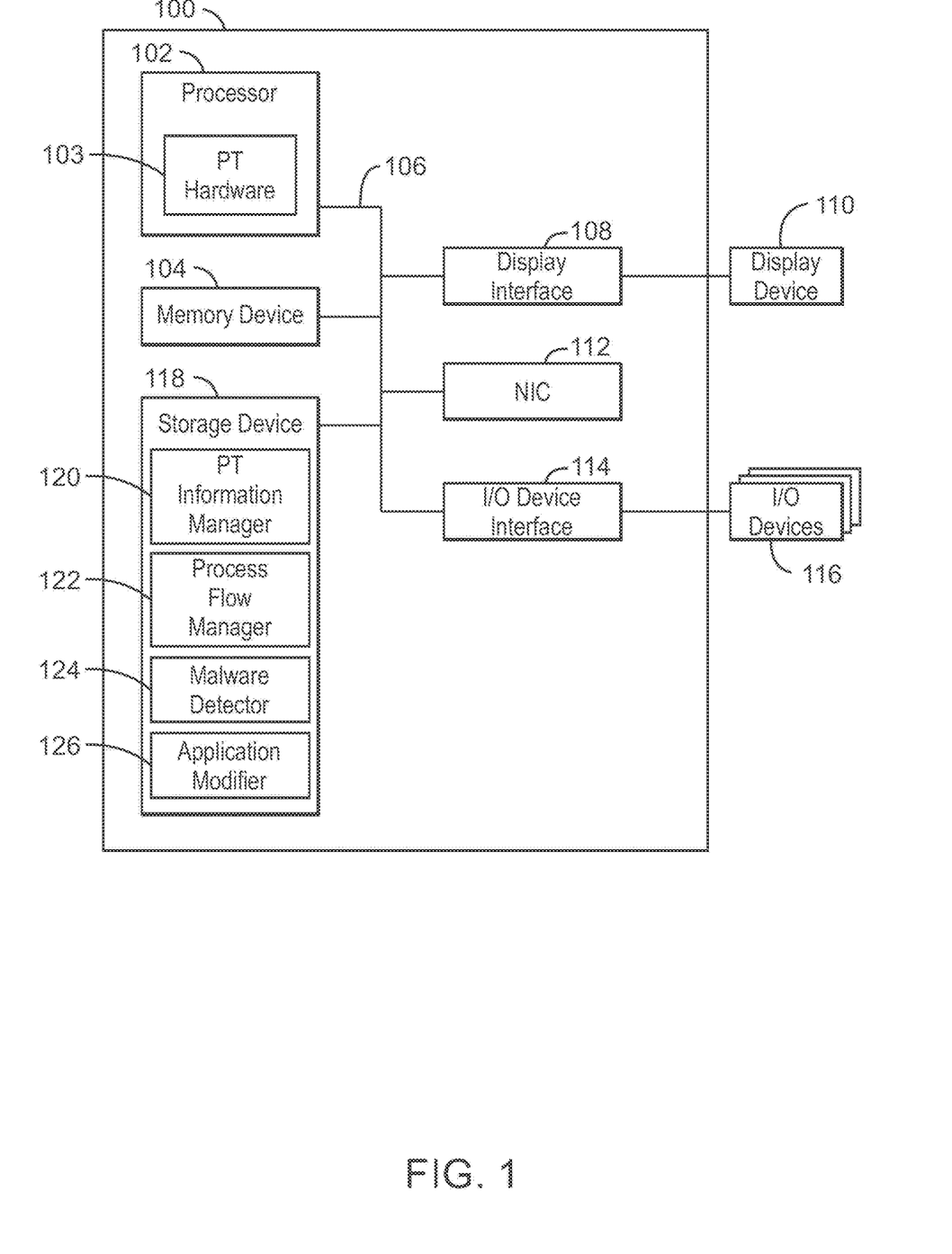
FIG. 1 illustrates a block diagram of a computing device that can detect malware instructions in memory.

FIG. 1 is a block diagram of an example of a host computing device that can detect malware instructions in memory. The host computing device 100 may be, for example, a mobile phone, laptop computer, desktop computer, or tablet computer, among others. The host computing device 100 may include a processor 102 that is adapted to execute stored instructions, as well as a memory device 104 that stores instructions that are executable by the processor 102 (also referred to herein as an application processor). The processor 102 can be a single core processor, a multi-core processor, a computing cluster, or any number of other configurations. The memory device 104 can include random access memory, read only memory, flash memory, or any other suitable memory systems. The instructions that are executed by the processor 102 may be used to implement a method that can detect malware instructions in memory. In some embodiments, the processor 102 can include processor trace (PT) hardware 103 that can generate trace data for a configured application, a computing device, or a range of instruction points.

The processor 102 may also be linked through the system interconnect 106 (e.g., PCI®, PCI-Express®, NuBus, etc.) to a display interface 108 adapted to connect the host computing device 100 to a display device 110. The display device 110 may include a display screen that is a built-in component of the host computing device 100. The display device 110 may also include a computer monitor, television, or projector, among others, that is externally connected to the host computing device 100. The display device 110 can include light emitting diodes (LEDs), and micro-LEDs, among others.

In addition, a network interface controller (also referred to herein as a NIC) 112 may be adapted to connect the host computing device 100 through the system interconnect 106 to a network (not depicted). The network (not depicted) may be a cellular network, a radio network, a wide area network (WAN), a local area network (LAN), or the Internet, among others.

The processor 102 may be connected through a system interconnect 106 to an input/output (I/O) device interface 114 adapted to connect the computing host device 100 to one or more I/O devices 116. The I/O devices 116 may include, for example, a keyboard and a pointing device, wherein the pointing device may include a touchpad or a touchscreen, among others. The I/O devices 116 may be built-in components of the host computing device 100, or may be devices that are externally connected to the host computing device 100.

In some embodiments, the processor 102 may also be linked through the system interconnect 106 to any storage device 118 that can include a hard drive, an optical drive, a USB flash drive, an array of drives, or any combinations thereof. In some embodiments, the storage device 118 can include any suitable applications. In some embodiments, the storage device 118 can include a processor trace (PT) information manager 120, a process flow manager 122, a malware detector 124, and an application modifier 126. In some embodiments, the PT information manager 120 can collect processor trace information corresponding to an application being executed by the processor. For example, the PT information manager 120 can also configure the PT hardware 103 with which execution to trace, etc., and collect trace data from the PT hardware 103. In some embodiments, the process flow manager 122 can detect an invalid indirect branch instruction from the processor trace information. In some examples, the malware detector 124 can detect at least one malware instruction being executed by the application in response to analyzing modified memory values corresponding to the invalid indirect branch. Furthermore, the application modifier 126 can block the application from accessing or modifying memory.

It is to be understood that the block diagram of FIG. 1 is not intended to indicate that the host computing device 100 is to include all of the components shown in FIG. 1. Rather, the host computing device 100 can include fewer or additional components not illustrated in FIG. 1 (e.g., additional memory components, embedded controllers, additional modules, additional network interfaces, etc.). Furthermore, any of the functionalities of the processor trace (PT) information manager 120, process flow manager 122, malware detector 124, and application modifier 126 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the processor trace (PT) information manager 120, process flow manager 122, malware detector 124, and application modifier 126 can be implemented with logic, wherein the logic, as referred to herein, can include any suitable hardware (e.g., a processor, among others), software (e.g., an application, among others), firmware, or any suitable combination of hardware, software, and firmware.

Figure 2:
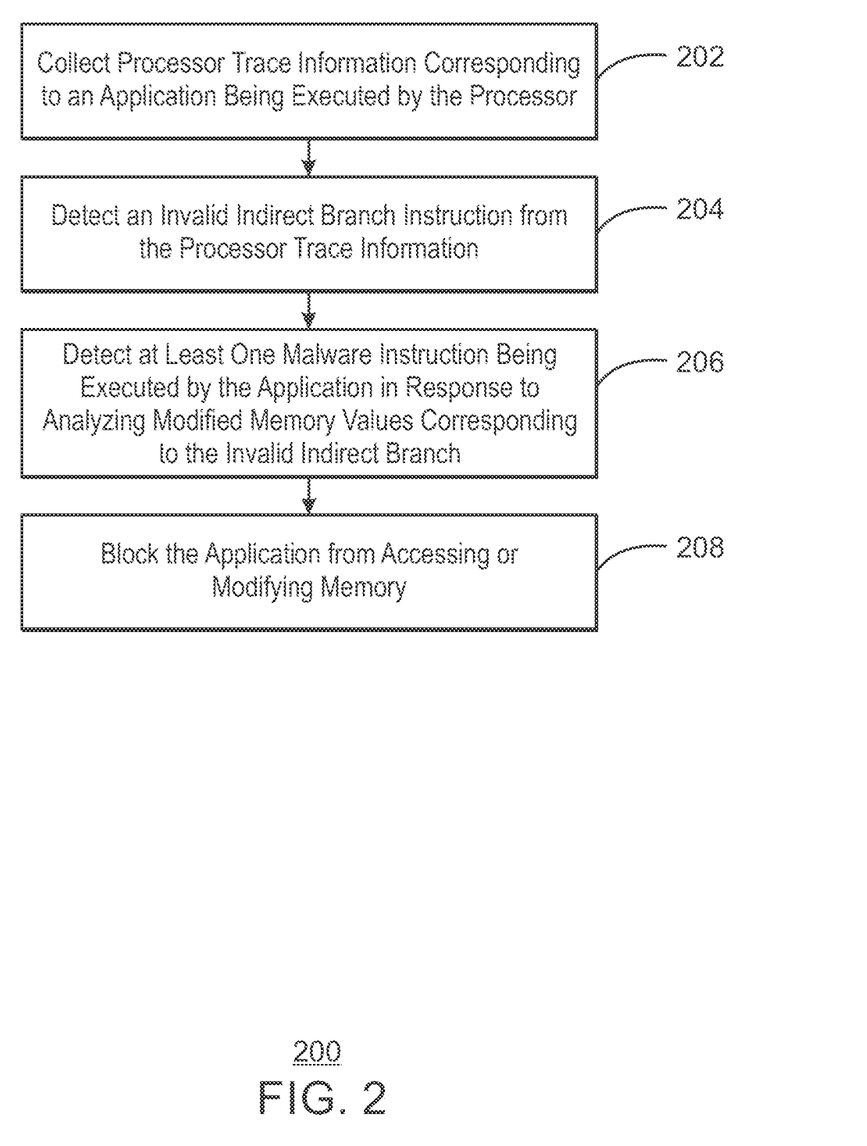
FIG. 2 illustrates a process flow diagram for detecting malware instructions in memory.

FIG. 2 illustrates a process flow diagram for detecting malware in memory. The method 200 illustrated in FIG. 2 can be implemented with any suitable computing component or device, such as the computing device 100 of FIG. 1.

At block 202, a processor trace (PT) information manager 120 can collect processor trace information corresponding to an application being executed by the processor. In some examples, the PT information manager 120 can collect processor trace information generated by PT hardware in a processor. For example, PT hardware can generate processor trace information for an application, a computing device, or a specified range of instruction pointers. In some examples, the PT hardware resides on a processor. In some embodiments, the PT hardware can generate processor trace information packets including a target instruction pointer (TIP), taken not taken (TNT) packets, and the like. In some examples, the processor trace information packets include control flow information of an application being executed such as instruction pointers, conditional branches, and indirect branch instruction targets, among others. In some embodiments, the PT information manager 120 can associate the processor trace information with a particular application being executed based on a process identifier.

At block 204, a process flow manager 122 can detect an invalid indirect branch instruction from the processor trace information. For example, the process flow manager 122 can detect a predetermined control flow integrity (CFI) policy for each application or process being executed. The CFI policy can specify the legitimate or allowed control flow transfers during an application execution. For example, the CFI policy can restrict the allowed values of code or instruction pointers at a conditional or indirect branch. In some embodiments, the process flow manager 122 can detect if an instruction executed by an application attempts to access a memory address that violates the CFI policy. For example, the process flow manager 122 can detect if a branch instruction attempts to execute an instruction that violates a CFI policy. In some embodiments, the process flow manager 122 can validate a target address of an indirect branch to prevent code reuse attacks. In some examples, code reuse attacks can exploit indirect branches to manipulate an instruction pointer and redirect the execution to an attacked intended point. As discussed in greater detail below in relation to FIG. 3, the process flow manager 122 can reside in a graphics processing unit (GPU), which can analyze multiple instructions in parallel to determine if any of the instructions violate a CFI policy. In some examples, the process flow manager 122 can transmit the processor trace information to the graphics processing unit, wherein the graphics processing unit can analyze at least two instructions from the processor trace information in parallel to detect the invalid indirect branch instruction.

At block 206, a malware detector 124 can detect at least one malware instruction being executed by the application in response to analyzing modified memory values corresponding to the invalid indirect branch. In some embodiments, the malware detector 124 can populate two separate queues with memory pages associated with an application being executed. In a first queue, the malware detector 124 can store each memory page associated with an executed application. In a second queue, the malware detector 124 can store memory pages that have been recently modified and/or executed with an application. In some embodiments, the malware detector 124 can analyze the data in the memory pages for signatures or patterns that match predetermined virus patterns. In some examples, the malware detector 124 can analyze the memory pages in the second queue for patterns that match virus patterns before analyzing the memory pages in the first queue. In some embodiments, the malware detector 124 can analyze the memory pages of the first queue and the second queue concurrently. For example, the malware detector 124 can set a predetermined weight for the second queue that results in analyzing a predetermined number of memory pages from the second queue before analyzing a memory page from the first queue.

In some embodiments, the malware detector 124 can generate a state machine based on predetermined virus patterns or signatures. For example, each node of the state machine can correspond to a memory address accessed by malware or an instruction that is executed by malware. In some examples, the malware detector 124 can generate a single table based on a double-array trie, wherein each entry of the single table includes a value generated based on a base value of the next state and a check value indicating the next state. The single table used to detect patterns in memory pages corresponding to malware is described in greater detail below in relation to FIGS. 5 and 6.

At block 208, an application modifier 126 can block the application from accessing or modifying memory. In some embodiments, the application modifier 126 can block execution of the malware instruction or the application that includes the malware instruction. For example, the application modifier 126 can prevent an application from accessing data stored in memory or executing instructions with the processor. In some embodiments, the application modifier 126 can delete data and files associated with the application from memory.

The process flow diagram of FIG. 2 is not intended to indicate that the operations of the method 200 are to be executed in any particular order, or that all of the operations of the method 200 are to be included in every case. Additionally, the method 200 can include any suitable number of additional operations. For example, the method 200 can include detecting the at least one malware instruction based on a single table, wherein the single table comprises a base array and a check array, and wherein each value stored in the single table comprises a base address in a predetermined number of higher order bits and a check address value in a predetermined number of lower order bits. In some examples, the check address value indicates a next state of a state machine based on a predetermined malware pattern.

Figure 3:
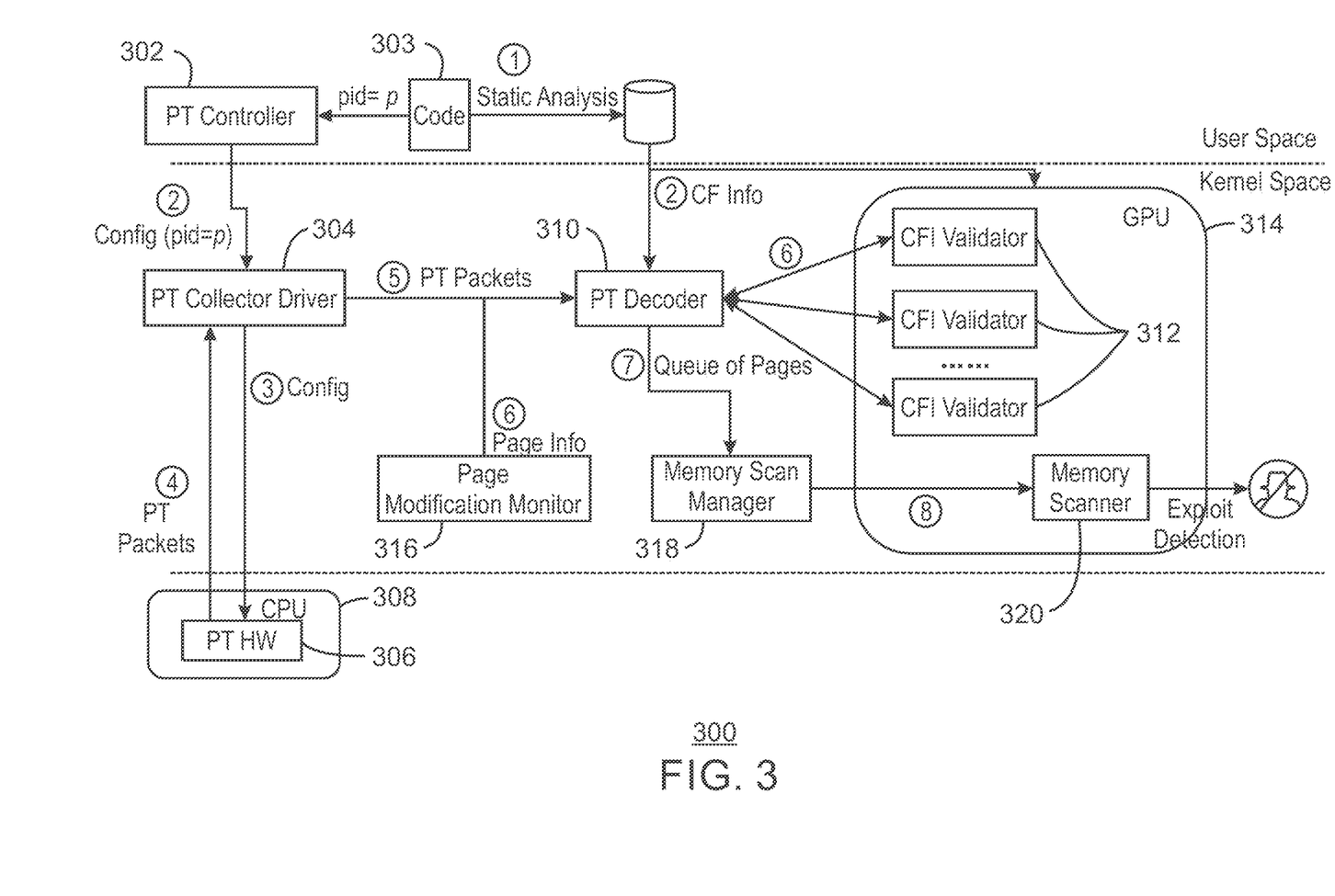
FIG. 3 illustrates a block diagram of data flow in a system for detecting malware instructions in memory.

FIG. 3 illustrates a block diagram of data flow in a system for detecting malware instructions in memory. The system 300 can be any suitable computing device, such as computing device 100 of FIG. 1.

In some embodiments, the system 300 can include a processor trace (PT) controller 302 that can be configured with the application to be traced. For example, the PT controller 302 may launch the application to be traced and configure a PT collector driver 304 (and eventually PT hardware) to trace the application. In some embodiments, the PT controller 302 can also configure the PT hardware to trace a running application. In some embodiments, the PT controller 302 can be a user-space application that configures run-time PT data collection for a monitored application. For example, code 303 for an application can include any number of instructions to be executed for a process or application. In some examples, the PT controller 302 can assign the code 303 a process identifier and send the process identifier of the application process corresponding to the code 303 to a PT collector driver 304 to configure PT hardware to trace the application. The PT collector driver 304 can transmit the code 303 and the process identifier to processor trace (PT) hardware 306 residing in a CPU 308 for configuration. In some examples, the PT collector driver 304 can be a driver that interacts with the PT hardware 306 to configure and collect PT data for a monitored application. In some embodiments, the PT hardware 306 can generate processor trace (PT) packets that are returned to the PT collector driver 304. In some examples, PT hardware 306 offers control flow tracing, which generates a variety of packets to be processed by a software decoder. The packets can include timing, program flow information (e.g. branch targets, branch taken/not taken indications) and program-induced mode related information. For example, the processor trace packet can indicate a code address such as an instruction pointer value indicating a memory address of an executed instruction.

In some embodiments, the PT collector driver 304 can transmit the PT packets to a PT decoder 310. In some examples, the PT decoder 310 can be a user- or kernel-space module that decodes PT data at runtime and extracts target IP (TIP) packets to determine indirect branch target addresses.

In some embodiments, the PT decoder 310 can transmit the PT packets to CFI validators 312. In some examples, the CFI validators 312 can reside in a GPU 314. The GPU 314 can execute the CFI validators 312 in parallel to simultaneously analyze multiple PT packets for instructions that attempt to access memory addresses or additional instructions that violate CFI policies. For example, the CFI validators 312 can be any suitable module that is executed in parallel execution units in a GPU and validates control flow integrity at indirect branches to determine whether the target address is listed in a set of allowed target addresses. In some examples, the PT decoder 310 can detect the results of the CFI validators 312. Upon CFI violation, the PT decoder 310 can finalize a queue of executed (code) memory pages to be scanned and initiate an immediate memory scan via the memory scan manager 318. The PT decoder 310 may be implemented in a CPU or in a GPU to reduce CPU overhead.

In some embodiments, the PT decoder 310 can also detect page modification data from a page modification monitor 316. The page modification data can indicate memory pages modified by an executed application within a predetermined period of time. In some embodiments, the page modification monitor 316 can be any suitable module that can further optimize the queue of memory pages to be scanned, as provided by the PT decoder 310. In some examples, the page modification monitor 316 may be implemented as a kernel-space file system component that monitors and maintains a list of recently modified memory pages. Alternatively, the page modification monitor 316 may be executed with native hardware to generate in-memory page modification logs. In some examples, the page modification monitor 316 can utilize a processor's support for accessed and dirty flags for page table entries. For example, on each write that sets a dirty flag for a page table entry, the processor generates an entry in an in-memory log to report the linear/physical address of the write. In some examples, the page modification monitor 316 can add CR3 filtering to enable per-process page modification monitoring. The page modification monitor 316 may utilize the page modification log, either maintained by an operating system or hardware, to discard the executed pages that have not been changed since the last scan.

In some embodiments, the PT decoder 310 can transmit the results of the CFI validators 312, the PT packets corresponding to instructions executed by an application, and page modification data to a memory scan manager 318. In some embodiments, the memory scan manager 318 can generate at least two queues of memory pages. In a first queue, the memory scan manager 318 can store each of the memory pages for scanning. The memory scan manager 318 can also store recently modified memory pages and recently executed memory pages based on the page modification table in a second queue. In some examples, the memory scan manager 318 stores recently modified memory pages and recently executed memory pages that also violated control flow integrity in the second queue. The memory scan manager 318 can transmit the memory pages from the first queue and the second queue to a memory scanner 320, which can detect patterns or signatures in the memory pages that indicate malware. In some embodiments, the memory scan manager 318 can prioritize each queue differently as discussed in greater detail below in relation to FIG. 4.

Accordingly, the control flow integrity based techniques described herein can use static binary analysis to generate legitimate control flow information, which can enforce control flow integrity policies of an application. When an application is loaded for execution, the PT hardware 306 can be configured to trace the application and the application's control flow information is loaded into GPU memory.

During application execution, the system 300 can decode captured PT information and extract the Target IP (TIP) packets. The indirect branch targets decoded from TIP packets are then sent to the GPU 314 and validated against the control flow information according to pre-specified CFI policies. Upon a CFI violation, the system 300 can notify the memory scan manager 318 with a queue of recently executed N pages. In some embodiments, the techniques also include maintaining a list of recently modified pages and removing the pages that have not been modified since the last scan from the queue. The final queue of pages is sent to the memory scanner 320 in GPU 314 for immediate inspection. In some examples, the value of N depends on the maximum length (in bytes) of malware signatures.

In some embodiments, the memory scanner 320, once triggered, can continue scanning the upcoming pages until the memory scanner determines that no malware signature is found in this scan. In some examples, the memory scanner 320 can analyze the recently executed N memory pages, whether the memory pages have been modified or not.

It is to be understood that the block diagram of FIG. 3 is not intended to indicate that the system 300 is to include all of the components shown in FIG. 3. Rather, the system 300 can include fewer or additional components not illustrated in FIG. 3 (e.g., additional memory components, embedded controllers, additional sensors, additional interfaces, etc.). In some embodiments, the PT collector driver 304 can be implemented as a part of the PT information manager 120 in the computing device 100 of FIG. 1. In some embodiments, the CFI validator 312 and/or memory scanner 320 can be implemented as part of the malware detector 124 of the computing device 100 of FIG. 1. Alternatively, in some examples, the process flow manager 122 can implement the CFI validator 312.

Figure 4:
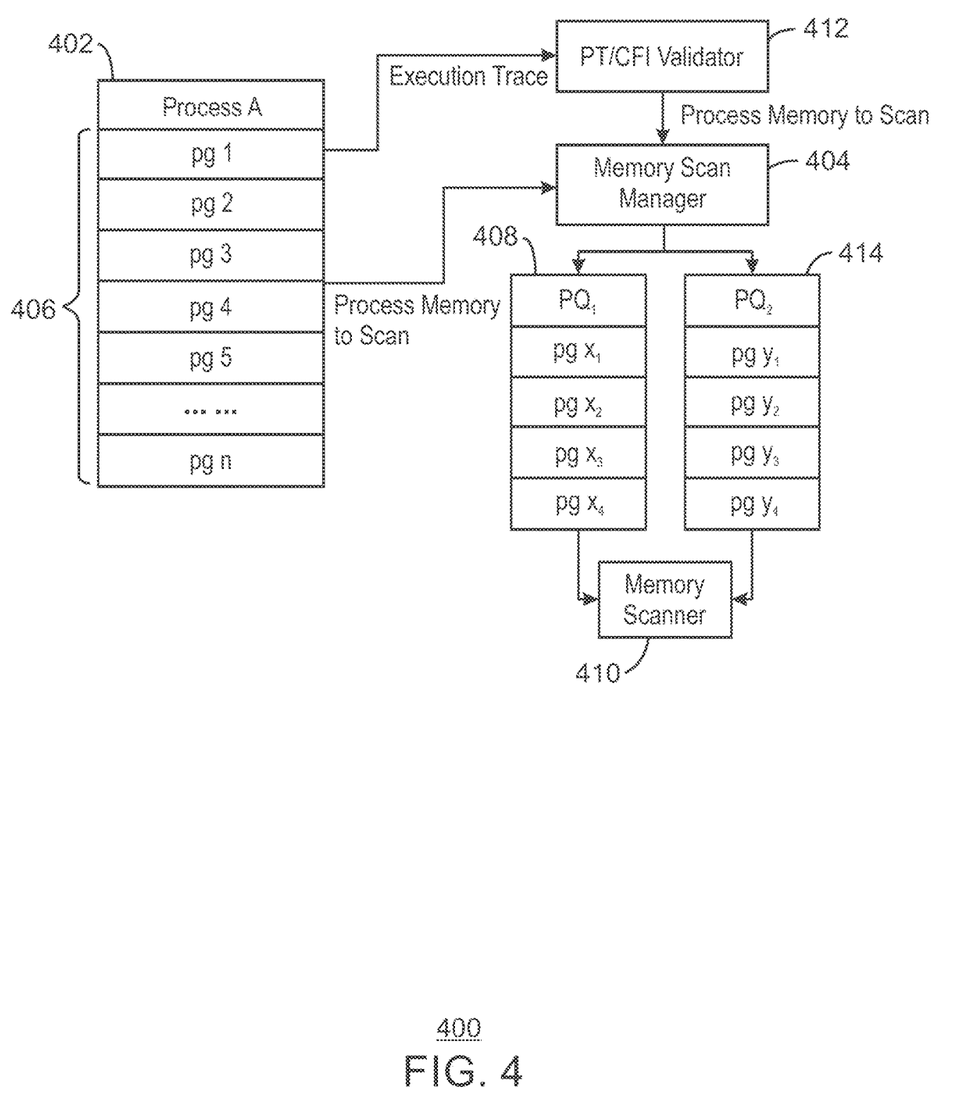
FIG. 4 illustrates a block diagram of detecting malware instructions in memory with two queues.

FIG. 4 illustrates a block diagram of detecting malware instructions in memory with two queues. In some embodiments, the two queues can be implemented with any suitable computing device, such as the computing device 100 of FIG. 1.

In some examples, the system 400 can use a runtime execution trace and control flow integrity policy of an application to populate any number of priority queues to be scanned for malware instructions. For example, the system 400 can utilize an integrated circuit's hardware capability to capture an execution trace. In some examples, an integrated circuit can also record control flow information of an application execution, including instruction pointers, indirect branch targets, and the like. Hardware based traces are unforgeable and hence, provide the control flow history of an application execution. In some examples, an integrated circuit's processor trace capability can generate a large amount of data, which can result in a large number of resources dedicated to runtime CFI validation. Accordingly, some systems can use a GPU based parallelization of runtime CFI validation as discussed above in relation to FIG. 3.

In some embodiments, when an application process 402 is executed, a memory scan manager module 404 can organize the memory pages 406 of the application process 402 to be scanned in a priority queue PQ1 408 and invoke the memory scanner 410 based on heuristics. A memory page can include a fixed length contiguous block of virtual memory dedicated to storing data and instructions for an application process. In some examples, the priority queue PQ1 408 can include each of the recently accessed memory pages of the application process 402. In some examples, the system 400 can use a PT/CFI validator module 412 that monitors the control flow integrity of an application process 402 at runtime. If the PT/CFI validator 412 detects a control flow violation, the PT/CFI validator 412 can store the recently executed memory pages 406 with a control flow violation in another priority queue PQ2 414 and trigger the memory scanner 410. To further reduce overhead, the system 400 can discard the memory pages that have not been modified or written to since the last scan by the memory scanner 410. In some embodiments, the memory scanner 410 can assign a higher priority to the memory pages in queue PQ2 414. For example, the memory scanner 410 can scan multiple memory pages from the queue PQ2 414 prior to scanning memory pages from the queue PQ1 408. The memory scanner 410, as discussed above, can use various techniques for matching predetermined patterns of malware to data stored in memory pages of a process. In some examples, another process watcher may add its own priority queue to achieve its desired objective.

In some example, the application process 402 can include fewer or additional memory pages 406. Additionally, the queues PQ1 408 and PQ2 414 can include fewer or additional memory pages. In some embodiments, any suitable number of queues can be used to prioritize memory pages to be scanned for malware. In some examples, a memory scan manager 404 can generate a first priority queue and a second priority queue, wherein the first priority queue comprises memory pages to be scanned for the application, and wherein the second priority queue comprises memory pages that have been modified within a predetermined period of time. In some examples, the memory scan manager 404 can scan the memory pages of the second priority queue prior to scanning the memory pages of the first priority queue. In some examples, the memory scan manager 404 can scan the memory pages of the second priority queue concurrently with scanning the memory pages of the first priority queue.

Figure 5:
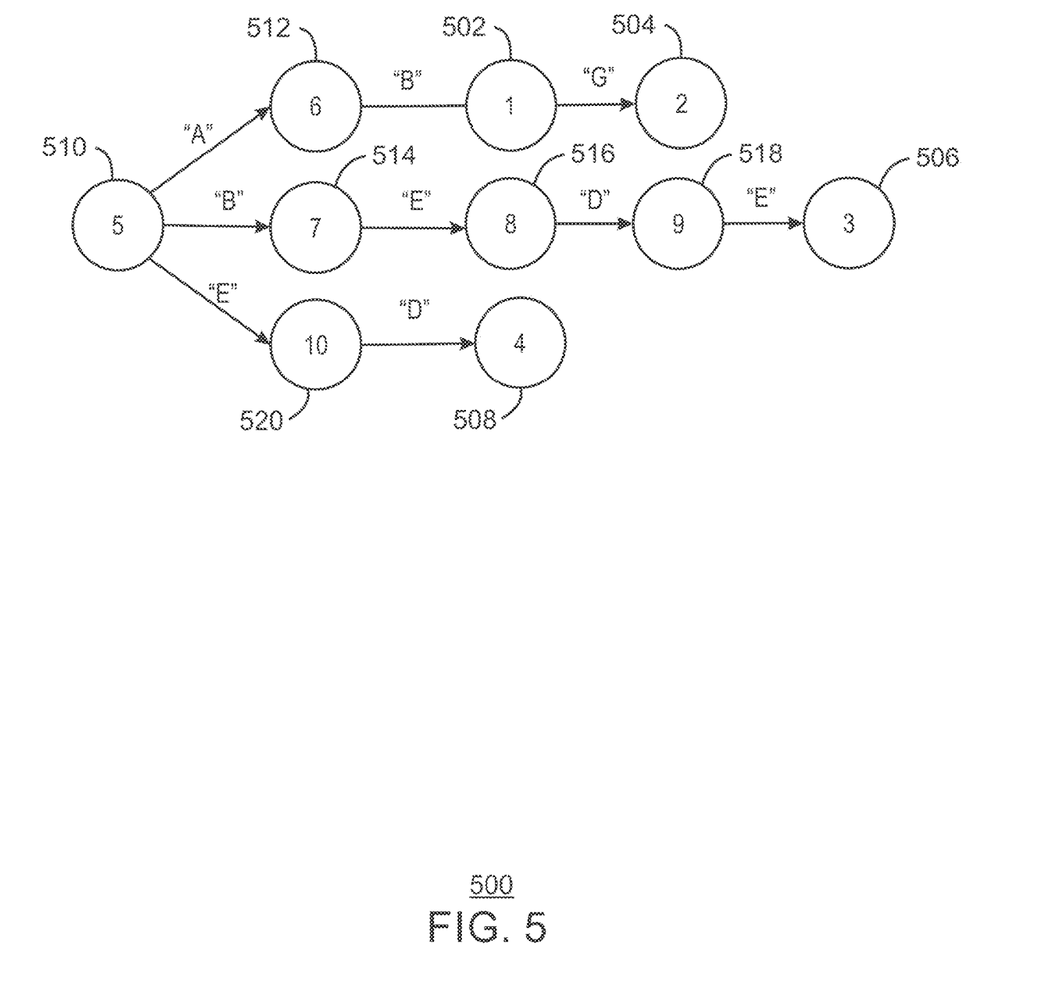
FIG. 5 illustrates an example state machine for generating a single table for malware instruction pattern matching.

FIG. 5 illustrates an example state machine for generating a single table for malware instruction pattern matching. In some embodiments, the state machine 500 can be detected or generated with any suitable computing device, such as the computing device 100 of FIG. 1.

In some embodiments, the state machine 500 can be generated based on predetermined patterns of malware. For example, final states of the state machine 500 can indicate matches for patterns indicative of malware instructions. In some embodiments, a state machine can include N final states or patterns and the final states can be numbered from 1 to N. In some examples, internal states that do not result in a final state can be numbered from N+1. For example, the state machine 500 includes ten states: state 1 502, state 2 504, state 3 506, state 4 508, state 5 510, state 6 512, state 7 514, state 8 516, state 9 518, and state 10 520. In some examples, the state machine 500 includes four final states or patterns: AB (states 5, 6, and 1), ABG (states 5, 6, 1, and 2), BEDE (states 5, 7, 8, 9, and 3), and ED (states 5, 10, and 4). Accordingly, the output vectors of patterns, "AB," "ABG," "BEDE," and "ED," are numbered as 1, 2, 3, and 4, respectively. The internal states of the state machine 500 can be numbered from 5 to 10. Therefore, each state smaller than state 5 represents a unique final state or pattern, while states 5-10 represent internal states that do not correspond to a final state or pattern.

It is to be understood that the state machine 500 can include fewer or additional states. For example, the state machine 500 can include any suitable number of final states or internal states.

Figure 6:
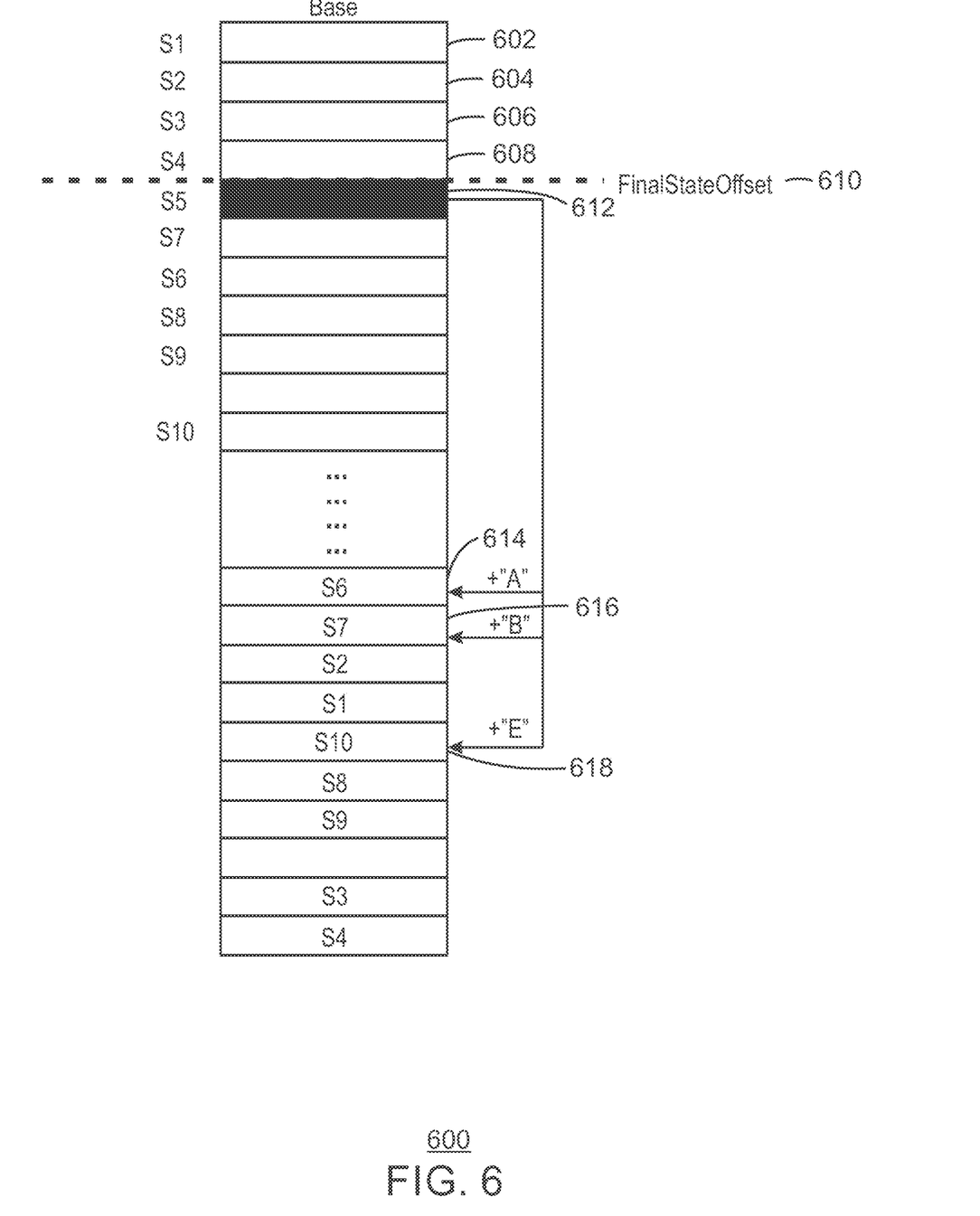
FIG. 6 illustrates an example single table for malware instruction pattern matching.

FIG. 6 illustrates an example single table for malware instruction pattern matching. The single table 600 can be generated with any suitable computing device, such as computing device 100 of FIG. 1.

In some embodiments, a memory scan manager can create a base array that stores a base address of the next state. Accordingly, the memory scan manager does not need to look up a next array first to get a next state identifier, and then look up a base array to determine a related base address of the next state. In some examples, the memory scan manager can distribute the base address for each state. For example, the memory scan manager can create an array and initiate a distribution of suitable base addresses for the states of a state machine. In some examples, the memory scan manager can determine usage of a base array and resize the base array based on the usage.

In some embodiments, a "base" array and a "check" array can be two parallel arrays, which can be combined into the single table 600. For example, the single table 600 can be an integer array named hashVal (32 bits), which consists of base addresses (higher 24 bits) and check char values (lower 8 bits) that are offsets to be added to the base address to indicate a next state. In some examples, each value of the single table 600 can be any suitable length and the base address and check var values can be any suitable length.

The example single table 600 is based on the example state machine 500 of FIG. 5. Accordingly, the single table 600 includes four final states S1 602, S2 604, S3 606, and S4 608. In some examples, once the base addresses for final states S1 602, S2 604, S3 606, and S4 608 are distributed, a parameter final state offset 610 can be set as the largest base address among these final states. Therefore, the memory scan manager can determine if a state is a final state based on a comparison of the base address of the state and the final state offset 610. In some examples, the comparison can be performed with a GPU and the memory scan manager can map a state to a state identifier with a CPU.

In some embodiments, the single table 600 includes internal state values according to internal states of a state machine. For example, state 5 of state machine 500 has three child nodes, which are states 6, 7, and 10. The memory scan manager can determine a base address S5 612 is to include a null value that can be used as a base address for child nodes: S6 614 (S5+"A"), S7 616 (S5+"B"), and S10 618 (S5+"E"). In some examples, the base address of each state can be unique. The single table 600 of FIG. 6 can determine the next state of S5 612 based on the base address S5 and an offset value indicating the next state.

It is to be understood that the single table 600 can include fewer or additional states corresponding to any suitable state machine. For example, the single table 600 can include any number of final states and any number of states following a final state offset value.

Figure 7:
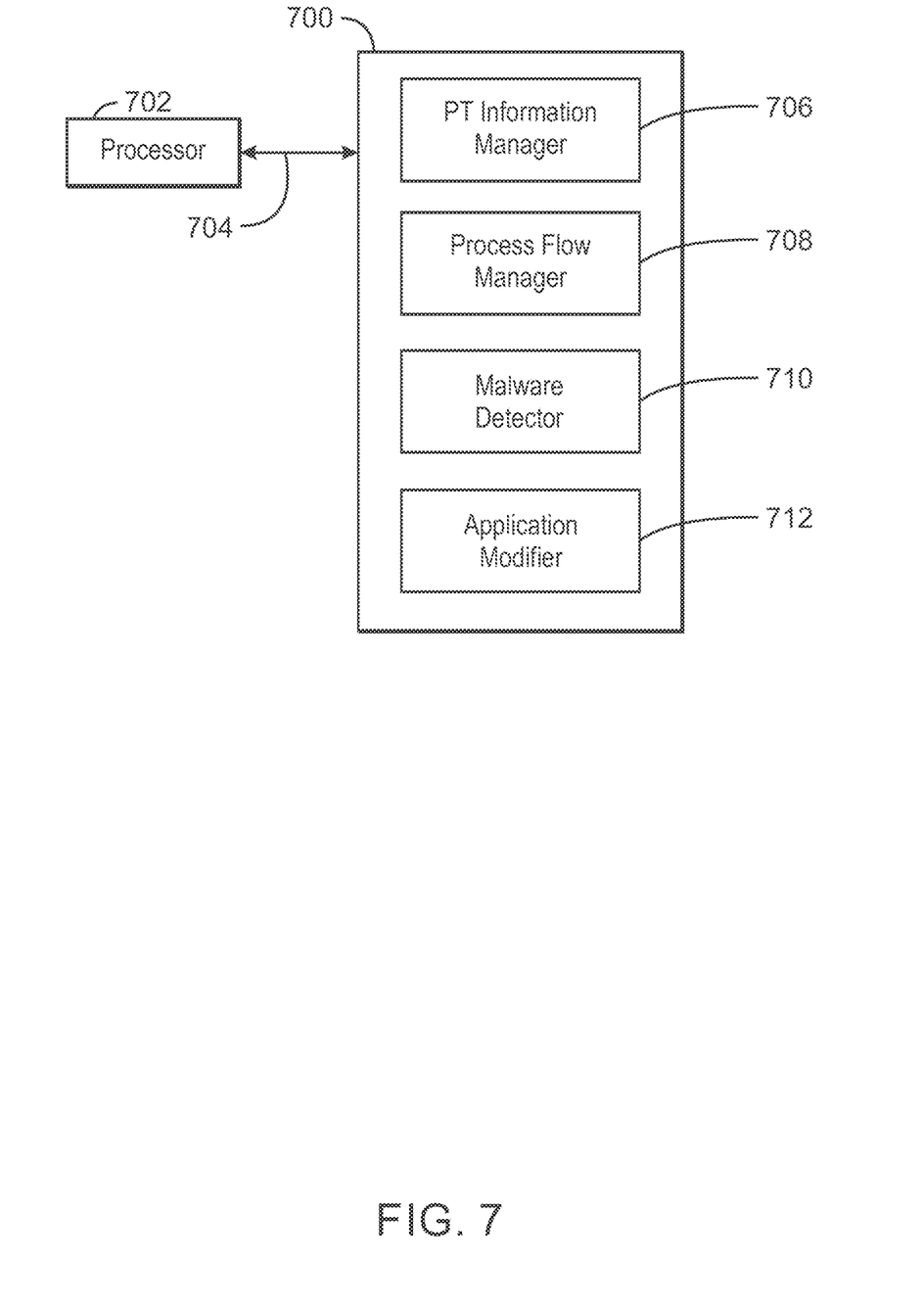
FIG. 7 is an example of a tangible, non-transitory computer-readable medium for detecting malware instructions in memory.

FIG. 7 illustrates a block diagram of a non-transitory computer readable media for detecting malware in memory. The tangible, non-transitory, computer-readable medium 700 may be accessed by a processor 702 over a computer interconnect 704. Furthermore, the tangible, non-transitory, computer-readable medium 700 may include code to direct the processor 702 to perform the operations of the current method.

The various software components discussed herein may be stored on the tangible, non-transitory, computer-readable medium 700, as indicated in FIG. 7. For example, a PT information manager 706 can collect processor trace information corresponding to an application being executed by the processor. In some embodiments, the process flow manager 708 can detect an invalid indirect branch instruction from the processor trace information. In some examples, the malware detector 710 can detect at least one malware instruction being executed by the application in response to analyzing modified memory values corresponding to the invalid indirect branch. Furthermore, the application modifier 712 can block the application from accessing or modifying memory.

It is to be understood that any suitable number of the software components shown in FIG. 7 may be included within the tangible, non-transitory computer-readable medium 700. Furthermore, any number of additional software components not shown in FIG. 7 may be included within the tangible, non-transitory, computer-readable medium 700, depending on the specific application.

EXAMPLE 1

In some examples, a system for detecting malware instructions in memory can include a processor to collect processor trace information corresponding to an application being executed by the processor. The processor can also detect an invalid indirect branch instruction from the processor trace information and detect at least one malware instruction being executed by the application in response to analyzing modified memory values corresponding to the invalid indirect branch. Furthermore, the processor can block the application from accessing or modifying memory.

Alternatively, or in addition, the processor can detect the at least one malware instruction based on a single table, wherein the single table comprises a base array and a check array, and wherein each value stored in the single table comprises a base address in a predetermined number of higher order bits and a check address value in a predetermined number of lower order bits. Alternatively, or in addition, the check address value can indicate a next state of a state machine based on a predetermined malware pattern. Alternatively, or in addition, the processor can transmit the processor trace information to a graphics processing unit, wherein the graphics processing unit is to analyze at least two instructions from the processor trace information in parallel to detect the invalid indirect branch instruction. Alternatively, or in addition, the processor can generate a first priority queue and a second priority queue, wherein the first priority queue comprises memory pages to be scanned for the application, and wherein the second priority queue comprises memory pages that have been modified within a predetermined period of time. Alternatively, or in addition, the processor can scan the memory pages of the second priority queue prior to scanning the memory pages of the first priority queue. Alternatively, or in addition, the processor can scan the memory pages of the second priority queue concurrently with scanning the memory pages of the first priority queue.

EXAMPLE 2

In some examples, a method for detecting malware can include collecting processor trace information corresponding to an application being executed by the processor. The method can also include detecting an invalid indirect branch instruction from the processor trace information and detecting at least one malware instruction being executed by the application in response to analyzing modified memory values corresponding to the invalid indirect branch. Furthermore, the method can include blocking the application from accessing or modifying memory.

Alternatively, or in addition, the method can include detecting the at least one malware instruction based on a single table, wherein the single table comprises a base array and a check array, and wherein each value stored in the single table comprises a base address in a predetermined number of higher order bits and a check address value in a predetermined number of lower order bits. Alternatively, or in addition, the check address value can indicate a next state of a state machine based on a predetermined malware pattern. Alternatively, or in addition, the method can include transmitting the processor trace information to a graphics processing unit, wherein the graphics processing unit is to analyze at least two instructions from the processor trace information in parallel to detect the invalid indirect branch instruction. Alternatively, or in addition, the method can include generating a first priority queue and a second priority queue, wherein the first priority queue comprises memory pages to be scanned for the application, and wherein the second priority queue comprises memory pages that have been modified within a predetermined period of time. Alternatively, or in addition, the method can include scanning the memory pages of the second priority queue prior to scanning the memory pages of the first priority queue. Alternatively, or in addition, the method can include scanning the memory pages of the second priority queue concurrently with scanning the memory pages of the first priority queue.

EXAMPLE 3

In some examples, a non-transitory computer readable media for detecting malware can include a plurality of instructions that, in response to execution by a processor, cause the processor to collect processor trace information corresponding to an application being executed by the processor. The plurality of instructions can also cause the processor to detect an invalid indirect branch instruction from the processor trace information and detect at least one malware instruction being executed by the application in response to analyzing modified memory values corresponding to the invalid indirect branch. Furthermore, the plurality of instructions can also cause the processor to block the application from accessing or modifying memory.

Alternatively, or in addition, the plurality of instructions can also cause the processor to detect the at least one malware instruction based on a single table, wherein the single table comprises a base array and a check array, and wherein each value stored in the single table comprises a base address in a predetermined number of higher order bits and a check address value in a predetermined number of lower order bits. Alternatively, or in addition, the check address value can indicate a next state of a state machine based on a predetermined malware pattern. Alternatively, or in addition, the plurality of instructions can also cause the processor to transmit the processor trace information to a graphics processing unit, wherein the graphics processing unit is to analyze at least two instructions from the processor trace information in parallel to detect the invalid indirect branch instruction. Alternatively, or in addition, the plurality of instructions can also cause the processor to generate a first priority queue and a second priority queue, wherein the first priority queue comprises memory pages to be scanned for the application, and wherein the second priority queue comprises memory pages that have been modified within a predetermined period of time. Alternatively, or in addition, the plurality of instructions can also cause the processor to scan the memory pages of the second priority queue prior to scanning the memory pages of the first priority queue. Alternatively, or in addition, the plurality of instructions can also cause the processor to scan the memory pages of the second priority queue concurrently with scanning the memory pages of the first priority queue.

Although an example embodiment of the disclosed subject matter is described with reference to block and flow diagrams in FIGS. 1-7, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A system for detecting malware comprising:
   a processor to:
   collect processor trace information corresponding to instructions for an application being executed by the processor, the instructions to include an indirect branch instruction, the processor trace information to indicate a memory address of the indirect branch instruction;
   determine whether the memory address of the indirect branch instruction is listed in a set of allowed target addresses for the indirect branch instruction;
   detect a control flow integrity (CFI) violation of a CFI policy associated with the application being executed by the processor when the memory address of the indirect branch instruction is not listed in the set of allowed target addresses for the indirect branch instruction;
   initiate a scan of executed memory pages associated with the application being executed by the processor in response to detection of the CFI violation, the memory pages organized into different priority queues to prioritize an order for the memory page scans;
   detect at least one malware instruction being executed by the application in response to scanning the memory pages organized into the different priority queues; and
   block the application from accessing or modifying memory.

2. The system of claim 1, wherein the processor is to detect the at least one malware instruction based on a single table, wherein the single table comprises a base array and a check array, and wherein each value stored in the single table comprises a base address in a predetermined number of higher order bits and a check address value in a predetermined number of lower order bits.

3. The system of claim 2, wherein the check address value indicates a next state of a state machine based on a predetermined malware pattern.

4. The system of claim 1, wherein the processor is to transmit the processor trace information to a graphics processing unit, wherein the graphics processing unit is to analyze at least two instructions from the processor trace information in parallel to detect an invalid indirect branch instruction.

5. The system of claim 1, wherein the processor is to generate a first priority queue and a second priority queue, wherein the first priority queue comprises memory pages to be scanned for the application, and wherein the second priority queue comprises memory pages that have been modified within a predetermined period of time.

6. The system of claim 5, wherein the processor is to scan the memory pages of the second priority queue prior to scanning the memory pages of the first priority queue.

7. The system of claim 5, wherein the processor is to scan the memory pages of the second priority queue concurrently with scanning the memory pages of the first priority queue.

8. A method for detecting malware comprising:
collecting processor trace information corresponding to instructions for an application being executed by a processor, the instructions to include an indirect branch instruction, the processor trace information to indicate a memory address of the indirect branch instruction;
determining whether the memory address of the indirect branch instruction is listed in a set of allowed target addresses for the indirect branch instruction;
detecting a control flow integrity (CFI) violation of a CFI policy associated with the application being executed by the processor when the memory address of the indirect branch instruction is not listed in the set of allowed target addresses for the indirect branch instruction;
initiating scanning of executed memory pages associated with the application being executed by the processor in response to detection of the CFI violation, the memory pages organized into different priority queues to prioritize an order for the memory page scans;
detecting at least one malware instruction being executed by the application in response to scanning the memory pages organized into the different priority queues; and
blocking the application from accessing or modifying memory.

9. The method of claim 8 comprising detecting the at least one malware instruction based on a single table, wherein the single table comprises a base array and a check array, and wherein each value stored in the single table comprises a base address in a predetermined number of higher order bits and a check address value in a predetermined number of lower order bits.

10. The method of claim 9, wherein the check address value indicates a next state of a state machine based on a predetermined malware pattern.

11. The method of claim 8, comprising transmitting the processor trace information to a graphics processing unit, wherein the graphics processing unit is to analyze at least two instructions from the processor trace information in parallel to detect an invalid indirect branch instruction.

12. The method of claim 8, comprising generating a first priority queue and a second priority queue, wherein the first priority queue comprises memory pages to be scanned for the application, and wherein the second priority queue comprises memory pages that have been modified within a predetermined period of time.

13. The method of claim 12, comprising scanning the memory pages of the second priority queue prior to scanning the memory pages of the first priority queue.

14. The method of claim 12, comprising scanning the memory pages of the second priority queue concurrently with scanning the memory pages of the first priority queue.

15. A non-transitory computer readable media for detecting malware comprising a plurality of instructions that, in response to execution by a processor, cause the processor to:
collect processor trace information corresponding to instructions for an application being executed by the processor, the instructions to include an indirect branch instruction, the processor trace information to indicate a memory address of the indirect branch instruction;
determine whether the memory address of the indirect branch instruction is listed in a set of allowed target addresses for the indirect branch instruction;
detect a control flow integrity (CFI) violation of a CFI policy associated with the application being executed by the processor when the memory address of the indirect branch instruction is not listed in the set of allowed target addresses for the indirect branch instruction;
initiate a scan of executed memory pages associated with the application being executed by the processor in response to detection of the CFI violation, the memory pages organized into different priority queues to prioritize an order for the memory page scans;
detect at least one malware instruction being executed by the application in response to scanning the memory pages organized into the different priority queues; and
block the application from accessing or modifying memory.

16. The non-transitory computer readable media of claim 15, wherein the plurality of instructions cause the processor to detect the at least one malware instruction based on a single table, wherein the single table comprises a base array and a check array, and wherein each value stored in the single table comprises a base address in a predetermined number of higher order bits and a check address value in a predetermined number of lower order bits.

17. The non-transitory computer readable media of claim 16, wherein the check address value indicates a next state of a state machine based on a predetermined malware pattern.

18. The non-transitory computer readable media of claim 15, wherein the plurality of instructions cause the processor to transmit the processor trace information to a graphics processing unit, wherein the graphics processing unit is to analyze at least two instructions from the processor trace information in parallel to detect an invalid indirect branch instruction.

19. The non-transitory computer readable media of claim 15, wherein the plurality of instructions cause the processor to generate a first priority queue and a second priority queue, wherein the first priority queue comprises memory pages to be scanned for the application, and wherein the second priority queue comprises memory pages that have been modified within a predetermined period of time.

20. The non-transitory computer readable media of claim 19, wherein the plurality of instructions cause the processor to scan the memory pages of the second priority queue prior to scanning the memory pages of the first priority queue.

21. The non-transitory computer readable media of claim 19, wherein the plurality of instructions cause the processor to scan the memory pages of the second priority queue concurrently with scanning the memory pages of the first priority queue.

* * * * *